(12) United States Patent
Osawa et al.

(10) Patent No.: US 12,169,335 B2
(45) Date of Patent: Dec. 17, 2024

(54) DISPLAY DEVICE AND METHOD FOR MANUFACTURING DISPLAY DEVICE

(71) Applicant: Japan Display Inc., Tokyo (JP)

(72) Inventors: Shuichi Osawa, Tokyo (JP);
Yoshikatsu Imazeki, Tokyo (JP);
Yoichi Kamijo, Tokyo (JP); Koichi Miyasaka, Tokyo (JP); Yoshifumi Kamei, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/379,424

(22) Filed: Oct. 12, 2023

(65) Prior Publication Data

US 2024/0134231 A1 Apr. 25, 2024
US 2024/0231157 A9 Jul. 11, 2024

(30) Foreign Application Priority Data

Oct. 19, 2022 (JP) .................... 2022-167784

(51) Int. Cl.
*G02F 1/13363* (2006.01)
(52) U.S. Cl.
CPC ............... *G02F 1/133637* (2021.01)

(58) Field of Classification Search
CPC ................................ G02F 1/133637
See application file for complete search history.

(56) References Cited

U.S. PATENT DOCUMENTS

| 6,151,166 | A | 11/2000 | Matsushita et al. | |
| 2018/0106958 | A1* | 4/2018 | Zeng | ........... G02B 6/0051 |
| 2021/0397035 | A1* | 12/2021 | Ochi | ........... G02F 1/133308 |

FOREIGN PATENT DOCUMENTS

| JP | H10319217 A | | 12/1998 | |
| JP | 2008135206 A | * | 6/2008 | ............ H01J 11/02 |

OTHER PUBLICATIONS

English Machine Translation of Japanese Pub. No. JP 2008 135 206 (Year: 2024).*

* cited by examiner

*Primary Examiner* — Donald L Raleigh
(74) *Attorney, Agent, or Firm* — K&L Gates LLP

(57) ABSTRACT

A display device includes a display panel, a color separation element configured to disperse light from a light source and to emit, to the display panel, a plurality of rays of separated light with wavelengths different from each other, and an outer adhesive portion that bonds a side surface of the display panel and the color separation element to each other over an entire perimeter of the display panel.

8 Claims, 7 Drawing Sheets

FIG.7
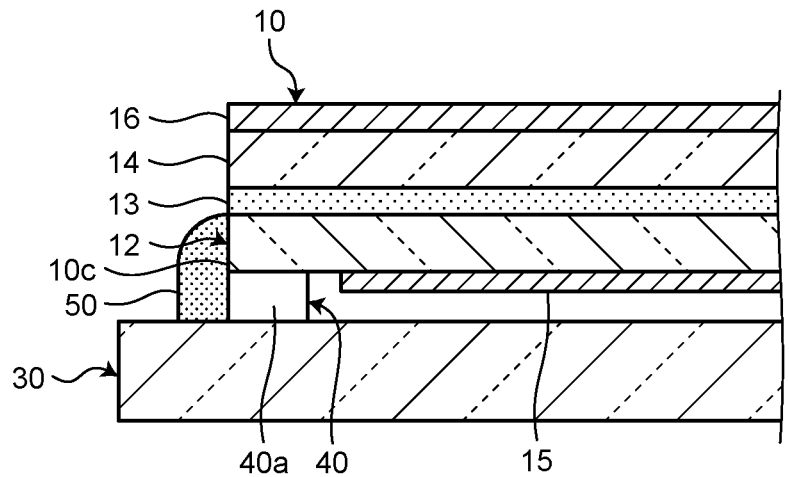
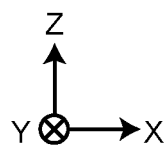
FIG.8
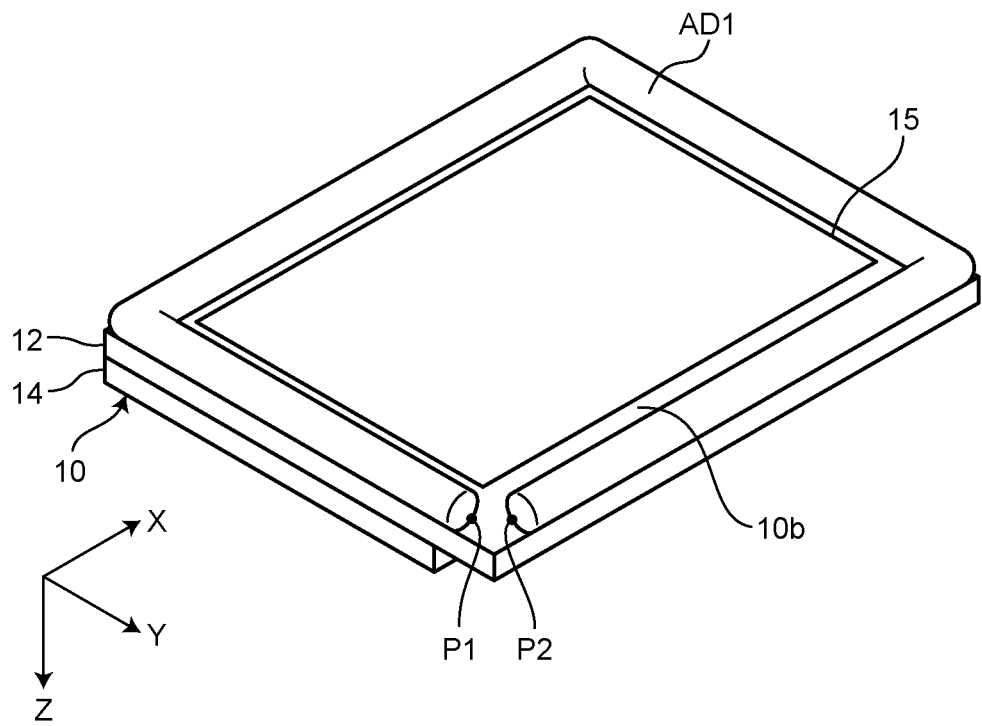

DISPLAY DEVICE AND METHOD FOR MANUFACTURING DISPLAY DEVICE

CROSS-REFERENCE TO RELATED APPLICATION

This application claims the benefit of priority from Japanese Patent Application No. 2022-167784 filed on Oct. 19, 2022, the entire contents of which are incorporated herein by reference.

BACKGROUND

1. Technical Field

The present disclosure relates to a display device and a method for manufacturing the display device.

2. Description of the Related Art

The display device in Japanese Patent Application Laid-open Publication No. H10-319217 (JP-A-H10-319217) includes a liquid crystal display panel having pixels, a color separation element, and a surface light source device that irradiates the color separation element with light. The color separation element separates light from the surface light source device into beams of light in colors different from each other and focuses the beams of light on the pixels of the display panel.

In the display device in JP-A-H10-319217, the liquid crystal display panel (display panel) and the color separation element desirably have a given distance therebetween so that the light from the color separation element is focused on the pixels. A gap with the aforementioned given distance is formed by containing a gap member with a given size in an adhesive and having the gap member sandwiched between the display panel and the color separation element when the display panel and the color separation element are bonded with the adhesive therebetween, for example.

However, when the gap member is mixed with the adhesive, foreign matter may be mixed into the adhesive, and air mixed into the adhesive may remain as voids even after a defoaming process is performed. Thus, the adhesive force of the adhesive may be decreased.

It is an object of the present disclosure to provide a display device and a method for manufacturing the display device that can suppress a decrease in adhesive force of an adhesive.

SUMMARY

A display device according to the present disclosure includes a display panel, a color separation element configured to disperse light from a light source and to emit, to the display panel, a plurality of rays of separated light with wavelengths different from each other, and an outer adhesive portion that bonds a side surface of the display panel and the color separation element to each other over an entire perimeter of the display panel.

A method for manufacturing a display device is disclosed. The method includes applying a first adhesive containing a gap member of a given size to a board surface of a display panel, sticking together a board surface of a color separation element and the board surface of the display panel to which the first adhesive has been applied, with the first adhesive between the board surfaces, the board surface of the color separation element dispersing light from a light source and emitting a plurality of rays of separated light with wavelengths different from each other, and applying a second adhesive to the color separation element and the display panel, which have been stuck to each other with the first adhesive, over an entire perimeter of the display panel from a side surface of the display panel to the color separation element, outside of the first adhesive in plan view.

BRIEF DESCRIPTION OF THE DRAWINGS

FIG. 7 is a sectional view of the display device illustrating a discontinuous portion;
FIG. 8 is a perspective view illustrating the display panel to which a first adhesive has been applied at a first application step.

DETAILED DESCRIPTION

Figure 1:
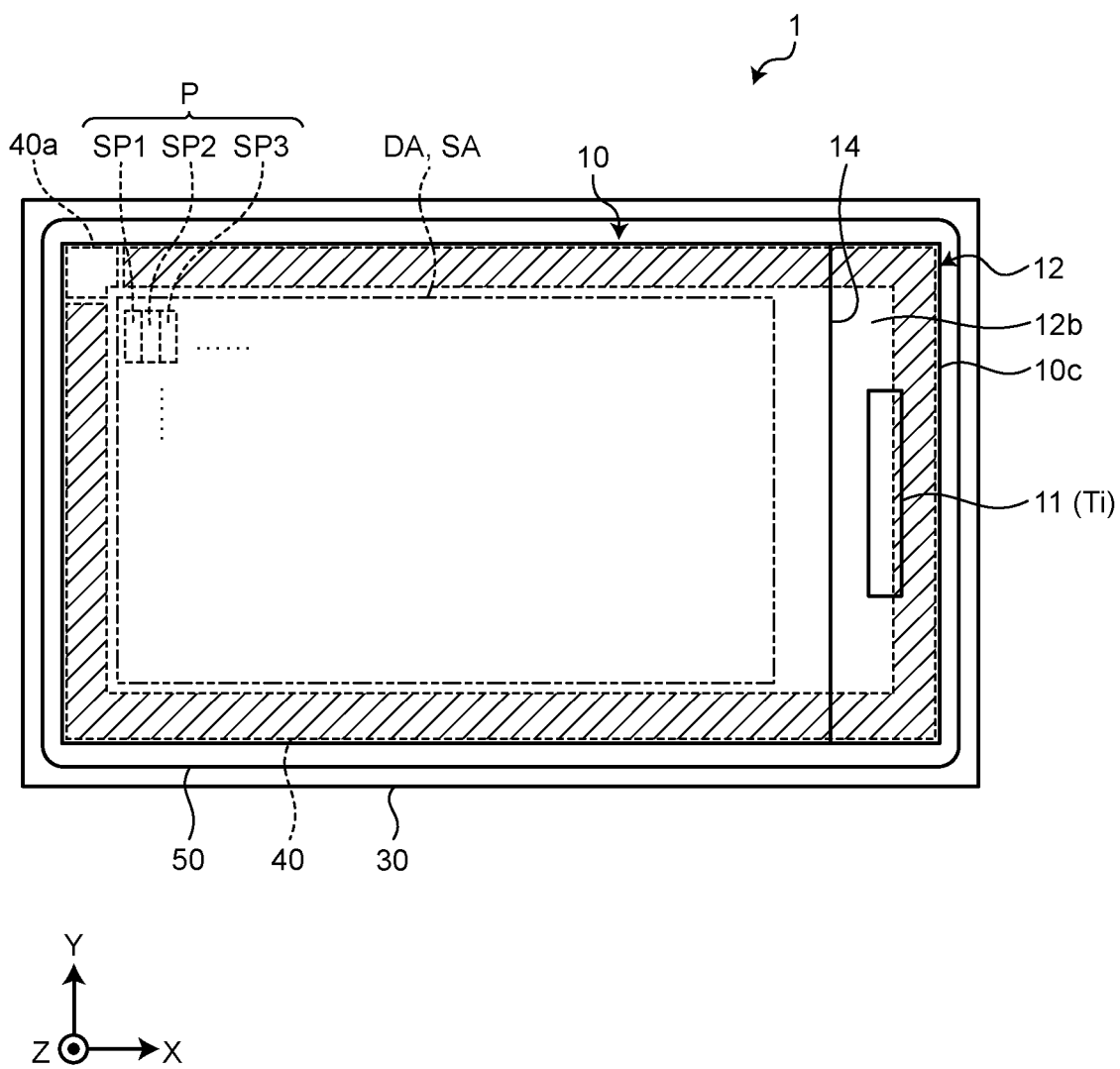
FIG. 1 is a plan view of a display device according to an embodiment of the present disclosure.

Embodiments of the present disclosure will be described below with reference to the drawings. The present disclosure is not limited by what is described in the following embodiments. Components described below include those that can be easily assumed by a person skilled in the art and those that are substantially the same. Furthermore, the components described below can be combined as appropriate.

What is disclosed herein is merely an example, and any appropriate modification that would be easily conceived of by a person skilled in the art, while maintaining the purport of the present disclosure, is naturally included in the scope of the present disclosure. The drawings may schematically illustrate the width, thickness, shape, and the like of each part compared to the actual mode for the sake of clarity of explanation, but this is merely an example and does not limit the interpretation of the present disclosure. In the present specification and the drawings, elements similar to those described previously with respect to the drawings already mentioned are given the same reference signs and the detailed description thereof may be omitted as appropriate.

The X and Y directions illustrated in the drawings are orthogonal to each other and parallel to a main surface of a substrate included in a display device 1. The +X and −X sides in the X direction and the +Y and −Y sides in the Y direction correspond to the sides of the display device 1. The Z direction is orthogonal to the X and Y directions and corresponds to the thickness direction of the display device 1. The +Z side in the Z direction corresponds to the front surface side where an image is displayed in the display device 1, and the −Z side in the Z direction corresponds to the rear surface side of the display device 1. In the present specification, "plan view" refers to viewing the display device 1 from the +Z side to the −Z side along the Z direction. The X, Y, and Z directions are examples, and the present disclosure is not limited to these directions.

Display Device 1

Figure 2:
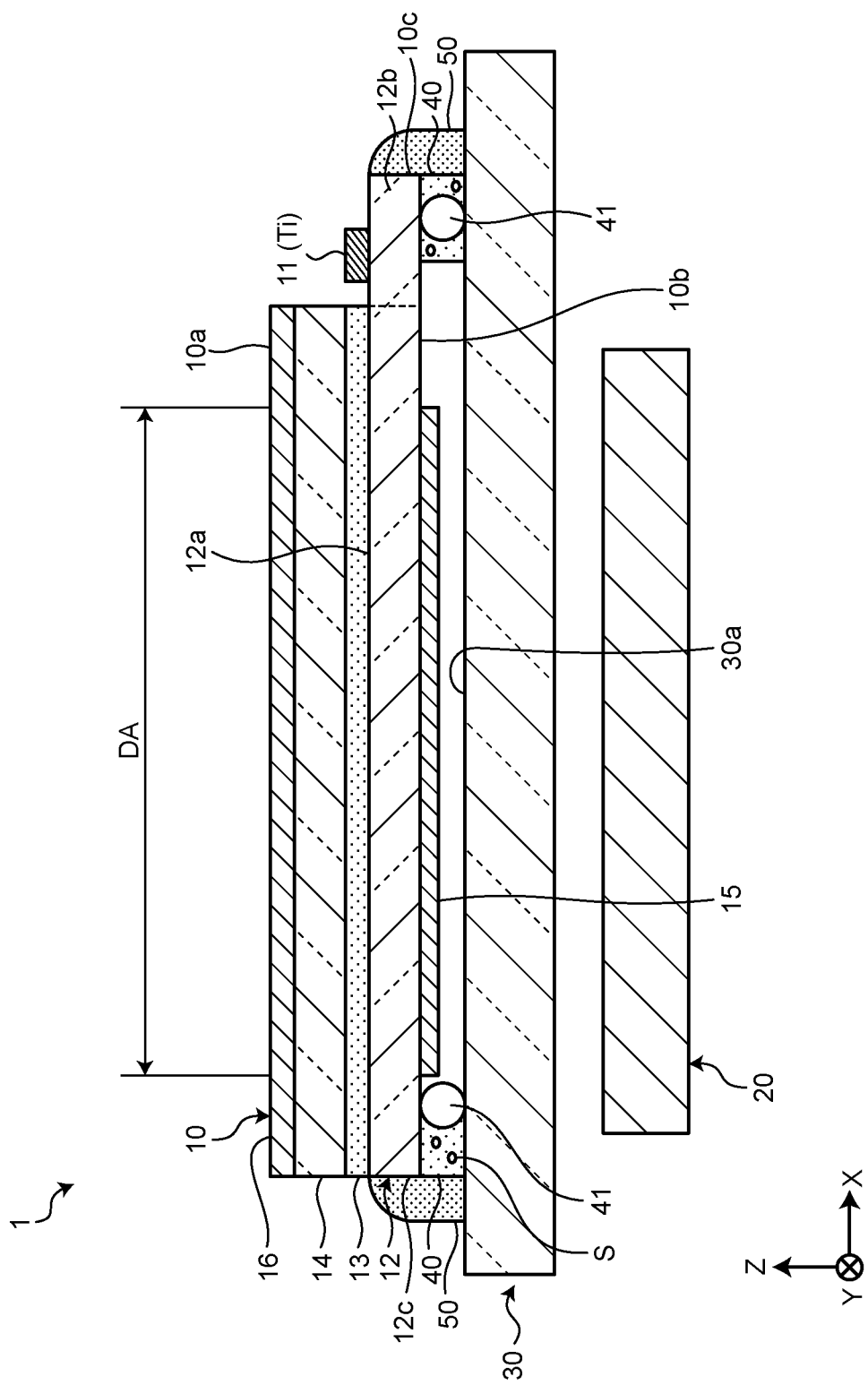
FIG. 2 is a sectional view of the display device.

FIG. 1 is a plan view of the display device 1 according to an embodiment of the present disclosure. FIG. 2 is a sectional view of the display device 1. The display device 1 displays images on the basis of image signals output from an external device (not illustrated) that is electrically coupled through a flexible wiring board (not illustrated).

The display device 1 is applied, for example, to a head-up display. The head-up display projects an image onto a translucent object, such as a vehicle windshield, to allow a user to see a virtual image. The display device 1 includes a display panel 10, a light source device 20, a color separation element 30, an inner adhesive portion 40, and an outer adhesive portion 50. The light source device 20, the color separation element 30, and the display panel 10 are aligned in this order along the Z direction from the −Z side to the +Z side.

The display panel 10 is a transmissive liquid crystal display. The display panel 10 may be, for example, an organic electroluminescent (EL) display and an inorganic EL display. The front surface of the display panel 10 has a display region DA where images are displayed. As illustrated in FIG. 2, the front surface of the display panel 10 corresponds to a display surface 10a where images are displayed. The rear surface of the display panel 10 on the opposite side of the display surface 10a corresponds to an opposite surface 10b. As illustrated in FIG. 1, the display panel 10 includes a plurality of pixels P aligned in a matrix (row-column configuration) along the X and Y directions in the display region DA.

The pixels P each have a first sub-pixel SP1, a second sub-pixel SP2, and a third sub-pixel SP3. The first sub-pixel SP1 is a red sub-pixel. The second sub-pixel SP2 is a green sub-pixel. The third sub-pixel SP3 is a blue sub-pixel. The first sub-pixel SP1, the second sub-pixel SP2 and the third sub-pixel SP3 are aligned in this order along the X direction. The array of the first sub-pixel SP1, the second sub-pixel SP2 and the third sub-pixel SP3 is what is called a stripe array. Hereinafter, when the first sub-pixel SP1, the second sub-pixel SP2, and the third sub-pixel SP3 are described without distinction, they may simply be described as a "sub-pixel SP". Not to mention, the array of sub-pixels SP is not limited to a stripe array, and the colors of sub-pixels SP are not limited to the aforementioned colors.

Figure 3:
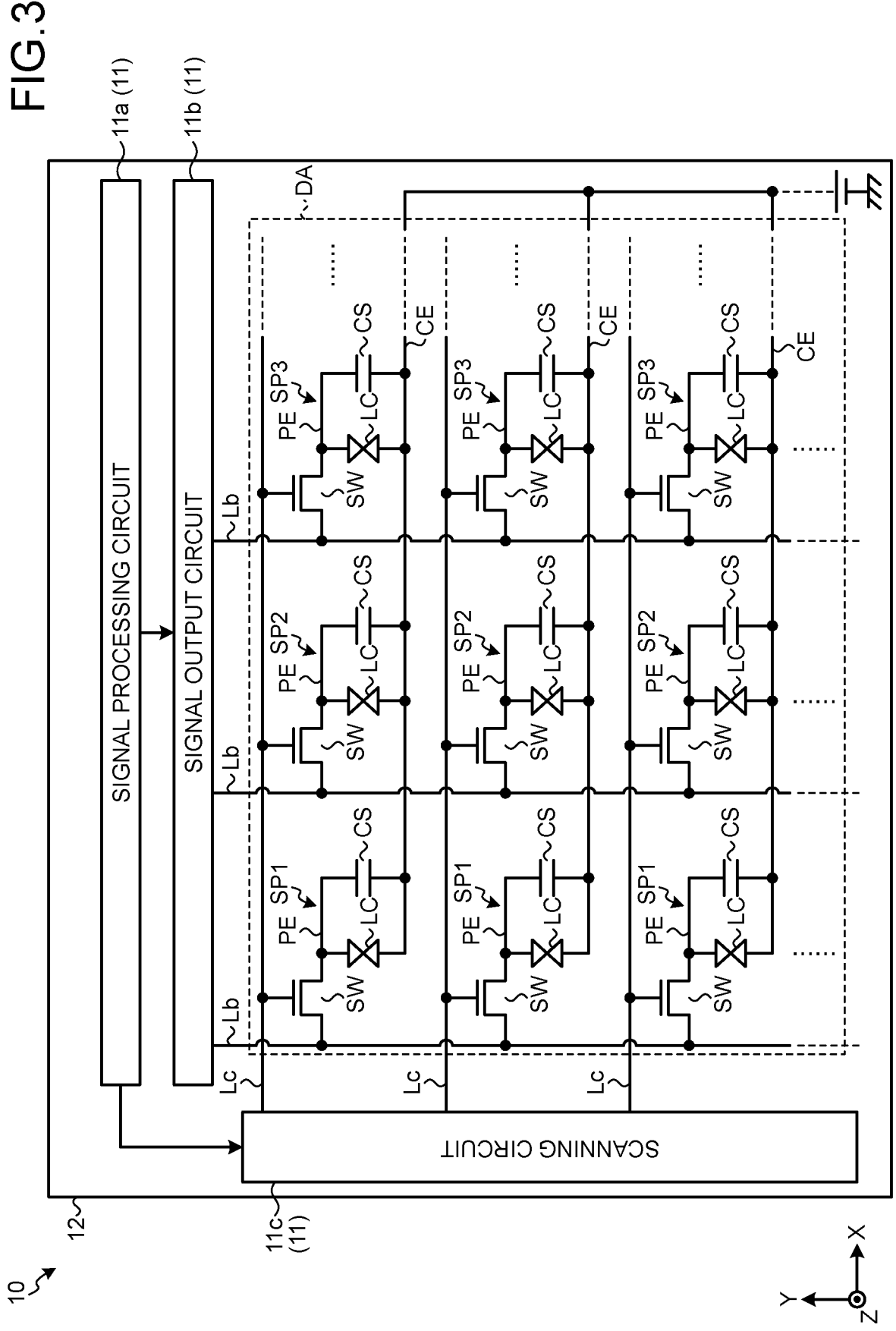
FIG. 3 is a view illustrating a circuit configuration of a display panel.

FIG. 3 is a view illustrating a circuit configuration of the display panel 10. The display panel 10 includes a drive circuit 11, as well as a switching element SW, a sub-pixel electrode PE, a common electrode CE, a liquid crystal capacitance LC, and a holding capacitance CS that are included in each of a plurality of the sub-pixels SP.

The drive circuit 11 drives the pixel P. The drive circuit 11 includes a signal processing circuit 11a, a signal output circuit 11b, and a scanning circuit 11c.

The signal processing circuit 11a outputs sub-pixel signals indicating gradations of the sub-pixels SP to the signal output circuit 11b on the basis of image signals transmitted from the external device. The signal processing circuit 11a outputs clock signals to the signal output circuit 11b and the scanning circuit 11c to synchronize the operation of the signal output circuit 11b with that of the scanning circuit 11c.

The signal output circuit 11b outputs the sub-pixel signals to the sub-pixels SP. The signal output circuit 11b and the sub-pixels SP are electrically coupled through a plurality of signal lines Lb extending along the Y direction.

The scanning circuit 11c scans the sub-pixels SP in synchronization with the output of the sub-pixel signals by the signal output circuit 11b. The scanning circuit 11c and the sub-pixels SP are electrically coupled through a plurality of scanning lines Lc extending along the X direction.

The switching element SW includes a thin-film transistor (TFT), for example. In the switching element SW, a source electrode is electrically coupled to the signal line Lb, and a gate electrode is electrically coupled to the scanning line Lc.

The sub-pixel electrode PE is coupled to a drain electrode of the switching element SW. A plurality of the common electrodes CE are arranged corresponding to the scanning lines Lc. The sub-pixel electrode PE and the common electrode CE are translucent.

The liquid crystal capacitance LC is a capacitive component of a liquid crystal material in a liquid crystal layer 13, which will be described below, between the sub-pixel electrode PE and the common electrode CE. The holding capacitance CS is placed between an electrode with the same potential as the common electrode CE and an electrode with the same potential as the sub-pixel electrode PE.

Figure 4:
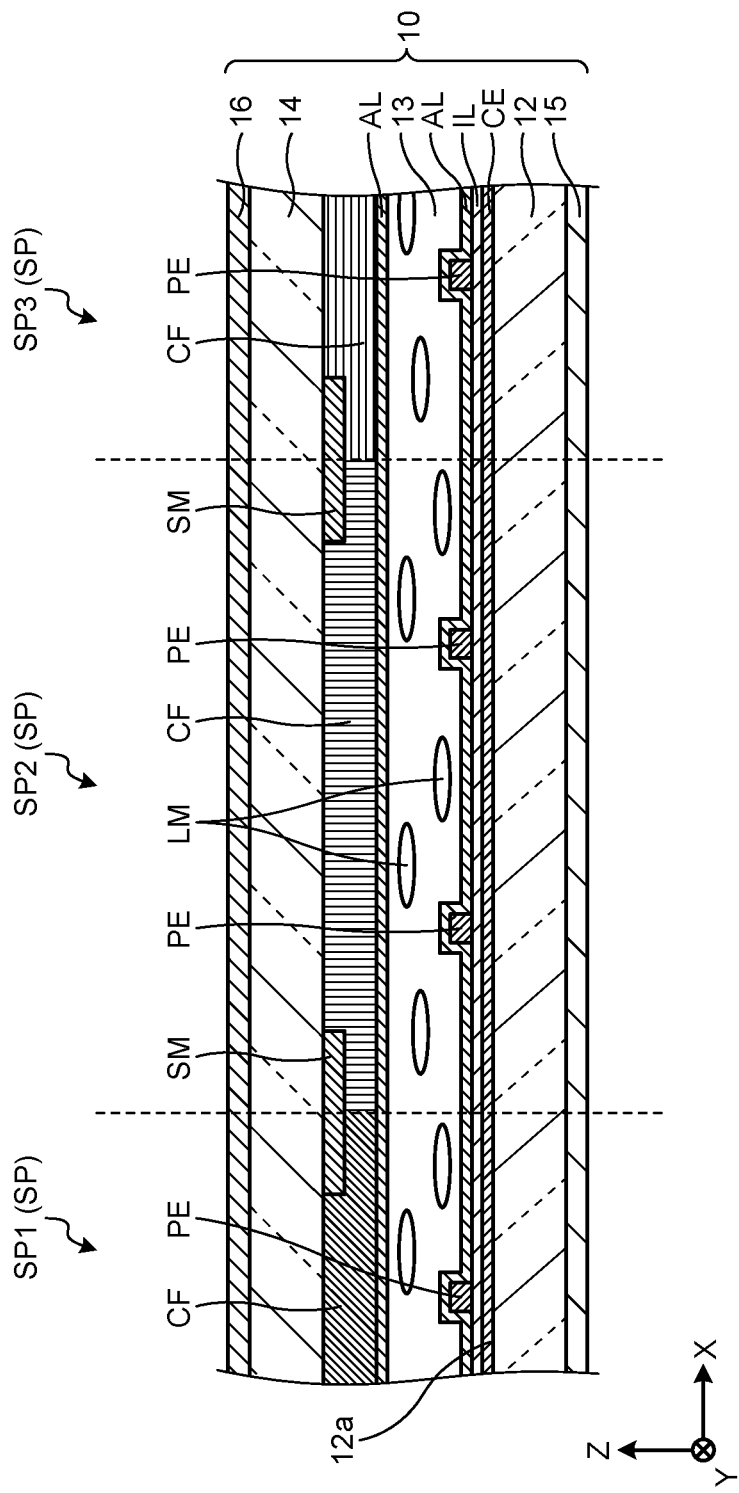
FIG. 4 is a sectional view of the display panel.

FIG. 4 is a sectional view of the display panel 10. The sub-pixel SP further includes a first substrate 12, the liquid crystal layer 13, and a second substrate 14. The first substrate 12, the liquid crystal layer 13, and the second substrate 14 are all translucent and are aligned in this order along the Z direction from the −Z side to the +Z side.

The first substrate 12 is rectangular in plan view and one first substrate 12 is provided for a plurality of the sub-pixels SP. The common electrode CE is placed on a main surface 12a on the +Z-side of the first substrate 12. An insulating layer IL is placed on the front surface of the common electrode CE, and the sub-pixel electrode PE and an orientation film AL are further placed.

The sub-pixel electrode PE is placed between the insulating layer IL and the orientation film AL. In this manner, the common electrode CE is placed on, and the sub-pixel electrode PE is placed above the first substrate 12. In other words, the display panel 10 is a horizontal electric field type liquid crystal display.

The second substrate 14 is located on the front surface side of the first substrate 12. The second substrate 14 is rectangular in plan view and one second substrate 14 is provided for a plurality of the sub-pixels SP. A color filter CF and a light-shielding film SM are placed on, and an orientation film AL is placed under the rear surface of the second substrate 14. The light-shielding film SM and the color filter CF are placed between the second substrate 14 and the orientation film AL.

The color filter CF is rectangular in plan view and one color filter CF is placed for one sub-pixel SP. The color filter CF is translucent, and the peak of the spectrum of light to be transmitted is predetermined. The peak of the spectrum corresponds to the color of the color filter CF. The color of the color filter CF is the same as that of the sub-pixel SP. In other words, the red first sub-pixel SP1 has a red color filter CF, the green second sub-pixel SP2 has a green color filter CF, and the blue third sub-pixel SP3 has a blue color filter CF.

The light-shielding film SM is lightproof and demarcates the sub-pixels SP. In other words, the light-shielding film SM overlaps in plan view the boundaries of the sub-pixels SP that are adjacent to each other in the X and Y directions. In FIG. 4, the signal line Lb and the scanning line Lc are omitted.

The liquid crystal layer 13 includes a plurality of liquid crystal molecules LM. The liquid crystal layer 13 is present between the first substrate 12 and the second substrate 14 and overlaps the display region DA in plan view. Specifically, the liquid crystal layer 13 is present between two orientation films AL facing each other. The orientation of the liquid crystal molecules LM is regulated by the two orientation films AL facing each other.

As illustrated in FIGS. 2 and 4, the display panel 10 further includes a first polarizing plate 15 placed on the rear surface of the first substrate 12 and a second polarizing plate 16 placed on the front surface of the second substrate 14.

The first polarizing plate 15 has a transmission axis orthogonal to the Z direction. The second polarizing plate 16 has a transmission axis orthogonal to the transmission axis of the first polarizing plate 15 and the Z direction.

As illustrated in FIGS. 1 and 2, the first substrate 12 has an exposed portion 12b that is exposed from the second substrate 14 in plan view. The exposed portion 12b is on the +X side of the second substrate 14 in plan view. An IC chip Ti including the drive circuit 11 is placed on the front surface of the exposed portion 12b. The front surface of the exposed portion 12b is part of the main surface 12a of the first substrate 12. The drive circuit 11 is located outside (specifically on the +X side) of the display region DA in plan view.

The drive circuit 11 outputs sub-pixel signals to the sub-pixels SP on the basis of image signals, thereby generating an electric field in the liquid crystal layer 13 and changing the orientation of the liquid crystal molecules LM. Thus, the light transmitted through the display panel 10 is modulated, to display an image.

As illustrated in FIG. 2, the light source device 20 is placed on the rear surface side of the display panel 10. The light source device 20 emits light (hereinafter described as emitted light) toward the display panel 10. The light source device 20 is, for example, a direct-lit backlight and has a plurality of light-emitting diodes (not illustrated).

As illustrated in FIGS. 1 and 2, the color separation element 30 is a rectangular plate in plan view. The color separation element 30 is larger than the display panel 10 in plan view. The periphery of the color separation element 30 is located outside of the periphery of the display panel 10 in plan view. Part of the color separation element 30 may be located outside of the display panel 10 in plan view.

As illustrated in FIG. 2, the color separation element 30 is placed between the display panel 10 and the light source device 20. The color separation element 30 is translucent, and the emitted light from the light source device 20 enters the display panel 10 through the color separation element 30.

Figure 5:
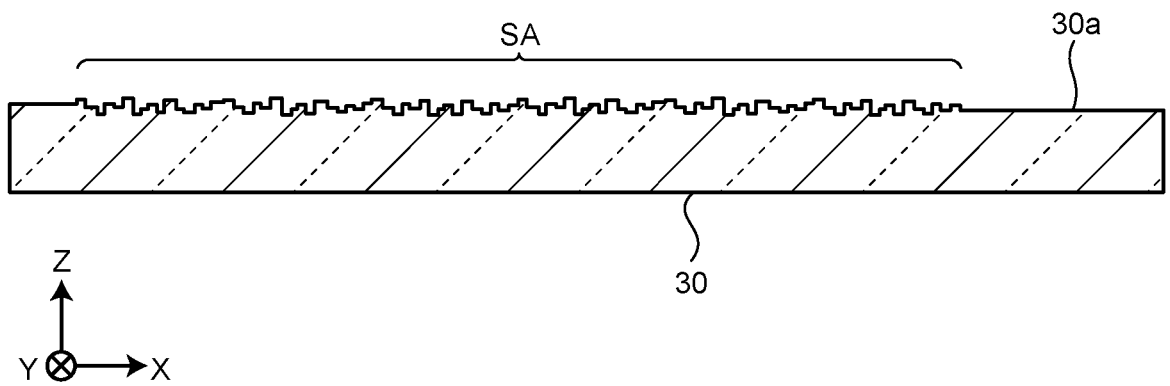
FIG. 5 is a sectional view of a color separation element.
Figure 6:
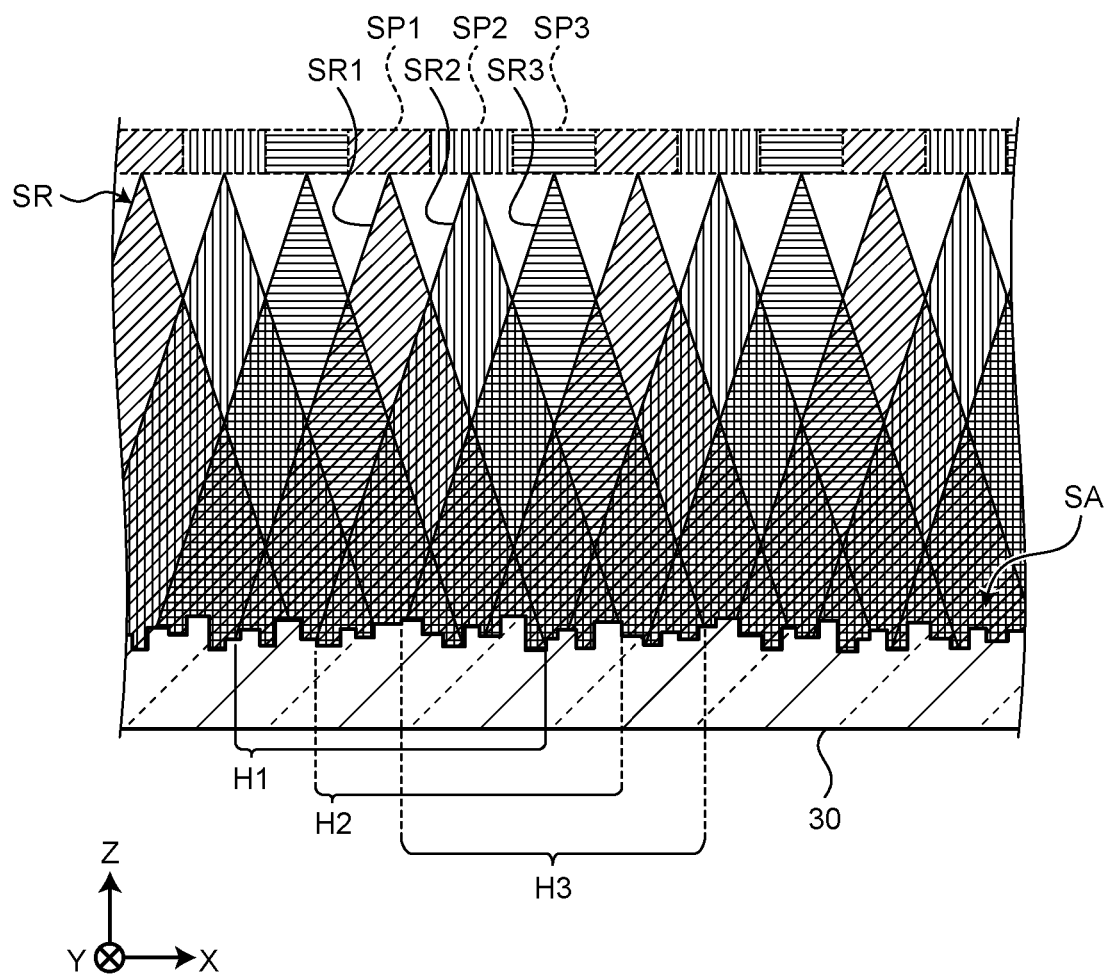
FIG. 6 is an enlarged sectional view of the color separation element.

FIG. 5 is a sectional view of the color separation element 30. FIG. 6 is an enlarged sectional view of the color separation element 30. The color separation element 30 disperses the emitted light from the light source device 20 and emits, to the pixel P, a plurality of rays of separated light SR with wavelengths different from each other. The color separation element 30 has a separation region SA that emits the separated light SR. The separation region SA is on the board surface of the color separation element 30 (front surface of the color separation element 30; hereinafter may be described as an emitting surface 30a) facing the display panel 10 and overlaps the display region DA in plan view.

As illustrated in FIG. 6, the separated light SR emitted from the separation region SA includes first separated light SR1 in red, the same color as the color of the first sub-pixel SP1, second separated light SR2 in green, the same color as the second sub-pixel SP2, and third separated light SR3 in blue, the same color as the third sub-pixel SP3. In the separation region SA, the front surface of the color separation element 30 has a given uneven shape.

The given uneven shape is such that the first separated light SR1 gathers in the first sub-pixel SP1 from a first range H1, which is larger than the first sub-pixel SP1 in plan view and overlaps the first sub-pixel SP1 in plan view. The given uneven shape is such that the second separated light SR2 gathers in the second sub-pixel SP2 from a second range H2, which is larger than the second sub-pixel SP2 in plan view and overlaps the second sub-pixel SP2 in plan view. Furthermore, the given uneven shape is such that the third separated light SR3 gathers in the third sub-pixel SP3 from a third range H3, which is larger than the third sub-pixel SP3 in plan view and overlaps the third sub-pixel SP3 in plan view.

There are a plurality of the first ranges H1 corresponding to the first sub-pixels SP1. There are a plurality of the second ranges H2 corresponding to the second sub-pixels SP2. There are a plurality of the third ranges H3 corresponding to the third sub-pixels SP3. The first range H1, the second range H2, and the third range H3 have portions overlapping each other in plan view.

In this manner, the color separation element 30 separates the emitted light from the light source device 20 for each wavelength corresponding to the color of the individual color filter CF, and causes the light (separated light SR) with the wavelength corresponding to the color filter CF to enter and be transmitted through the color filter CF. Thus, the loss of quantity of the emitted light from the light source device 20 can be suppressed and the utilization efficiency of the emitted light can be increased compared to a case in which the display device 1 does not include the color separation element 30 and the emitted light from the light source device 20 directly enters the display panel 10.

As illustrated in FIG. 2, the inner adhesive portion 40 is present between the display panel 10 and the color separation element 30. Specifically, the inner adhesive portion 40 bonds the opposite surface 10b of the display panel 10 to the emitting surface 30a of the color separation element 30. As illustrated in FIG. 1, the inner adhesive portion 40 bonds the display panel 10 and the color separation element 30 to each other inside of the outer adhesive portion 50 in plan view. Specifically, the inner adhesive portion 40 is at the peripheral portion of the first substrate 12 in plan view and around the display region DA and the separation region SA in plan view. The first polarizing plate 15 is inside of the inner adhesive portion 40 in plan view.

The inner adhesive portion 40 has a discontinuous portion 40a. The discontinuous portion 40a is a section where the basic material of the inner adhesive portion 40 is discontinuous. The discontinuous portion 40a causes a section inside of the inner adhesive portion 40 to communicate with a section outside of the inner adhesive portion 40 between the display panel 10 and the color separation element 30. Although there is one discontinuous portion 40a in the present embodiment, there may be a plurality of the discontinuous portions 40a.

The inner adhesive portion 40 is formed by a first adhesive to be described below. The first adhesive is a one-part adhesive and, for example, an ultraviolet (UV) curable adhesive.

As illustrated in FIG. 2, the inner adhesive portion 40 contains a plurality of gap members 41 of a given size. The gap member 41 is spherical, for example, and has a given diameter corresponding to the given size. The ratio of the total volume of the gap members 41 to the volume of the inner adhesive portion 40 is approximately 2%. The gap member 41 has a state in which all of the gap member 41 is covered by the inner adhesive portion 40 and a state in which part of the gap member 41 is exposed from the inner adhesive portion 40.

The hardness of the gap member 41 is higher than that of the inner adhesive portion 40. Therefore, the gap member 41 is less deformable to external forces than the inner adhesive portion 40.

The gap member 41 is sandwiched by the opposite surface 10b of the display panel 10 and the emitting surface 30a of the color separation element 30. Thus, the distance in the Z direction between the display panel 10 and the color separation element 30 is substantially constant at the given diameter. The given diameter is defined as the size at which the separated light SR gathers in the sub-pixel SP.

The gap members 41 are contained in the first adhesive in advance. Specifically, the gap member 41 is mixed with the first adhesive before manufacturing of the display device 1 is started. At this time, air is mixed into the first adhesive. A small amount of the air remains in the first adhesive even after a defoaming process is performed, and voids are formed in the first adhesive. When the first adhesive has voids, voids S are formed in the inner adhesive portion 40, as illustrated in FIG. 2.

As illustrated in FIG. 1, the outer adhesive portion 50 bonds the display panel 10 and the color separation element 30 to each other outside of the inner adhesive portion 40 in plan view. As illustrated in FIGS. 1 and 2, the outer adhesive portion 50 bonds a side surface 10c of the display panel 10 and the color separation element 30 (specifically, the emitting surface 30a) to each other over the entire perimeter of the display panel 10. The side surface 10c of the display panel 10 specifically corresponds to the side surface of the first substrate 12.

The outer adhesive portion 50 is placed around the entire perimeter of the inner adhesive portion 40 in plan view. That is, the outer adhesive portion 50 is continuously placed around the inner adhesive portion 40 without interruption in plan view. Furthermore, the outer adhesive portion 50 is continuously placed without interruption from the side surface 10c of the display panel 10 to the emitting surface 30a of the color separation element 30. The outer adhesive portion 50 is in contact with the inner adhesive portion 40. The outer adhesive portion 50 may be separated from the inner adhesive portion 40.

The outer adhesive portion 50 is formed by a second adhesive. The second adhesive is a one-part adhesive and, for example, a UV curable adhesive. The second adhesive differs from the first adhesive in that the second adhesive does not have a mixture such as the gap member 41. In other words, the second adhesive does not have air mixed in, and the second adhesive and the outer adhesive portion 50 have no voids.

FIG. 7 is a sectional view of the display device 1 illustrating the discontinuous portion 40a. As described above, the outer adhesive portion 50 is formed outside of the inner adhesive portion 40 in plan view and continuously around the entire perimeter of the inner adhesive portion 40. Thus, the outer adhesive portion 50 bonds the display panel 10 to the color separation element 30 while covering the discontinuous portion 40a. With this configuration, the outer adhesive portion 50 can prevent foreign matter from entering through the discontinuous portion 40a.

Method for Manufacturing Display Device 1

A bonding process for bonding the display panel 10 to the color separation element 30 in a method for manufacturing the display device 1 will be described next.

The bonding process includes a first application step of applying the first adhesive, a sticking step of sticking the color separation element 30 and the display panel 10 together with the first adhesive therebetween, a second application step of applying the second adhesive, and a curing step of curing the first adhesive and the second adhesive. The first application step, the sticking step, the second application step, and the curing step are performed in this order.

FIG. 8 is a perspective view illustrating the display panel 10 to which a first adhesive AD1 has been applied at the first application step. At the first application step, the first adhesive AD1 containing the gap members 41 of the given size is applied to the board surface (opposite surface 10b) of the display panel 10. At the first application step, the first adhesive AD1 is applied around the first polarizing plate 15 on the opposite surface 10b of the display panel 10. The first adhesive AD1 is applied using a dispenser.

A start position P1, where the application of the first adhesive AD1 starts, and an end position P2, where the application of the first adhesive AD1 ends, are different from each other in plan view. With this configuration, the discontinuous portion 40a in the inner adhesive portion 40 is formed when the first adhesive AD1 cures.

Figure 9:
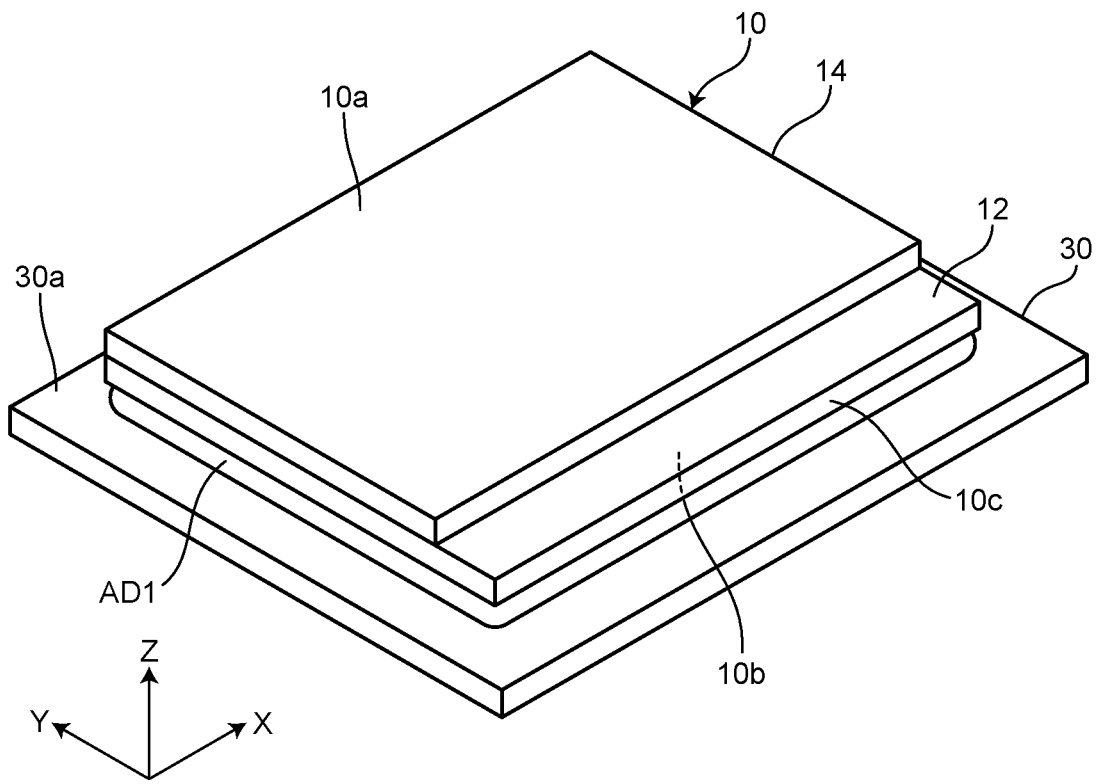
FIG. 9 is a perspective view illustrating the color separation element and the display panel being stuck together at a sticking step.

FIG. 9 is a perspective view illustrating the color separation element 30 and the display panel 10 being stuck together at the sticking step. At the sticking step, the board surface (emitting surface 30a) of the color separation element 30 and the board surface (opposite surface 10b) of the display panel 10 to which the first adhesive AD1 has been applied are stuck together with the first adhesive AD1 therebetween. At the sticking step, the gap member 41 is sandwiched by the board surface (emitting surface 30a) of the color separation element 30 and the opposite surface 10b of the display panel 10.

When the color separation element 30 and the display panel 10 are stuck together, air that is inside of the first adhesive AD1 in plan view between the color separation element 30 and the display panel 10 leaks from the discontinuous portion 40a outside of the first adhesive AD1. Thus, deformation of the color separation element 30 and the display panel 10 due to the force created by air compression between the color separation element 30 and the display panel 10 can be prevented.

Figure 10:
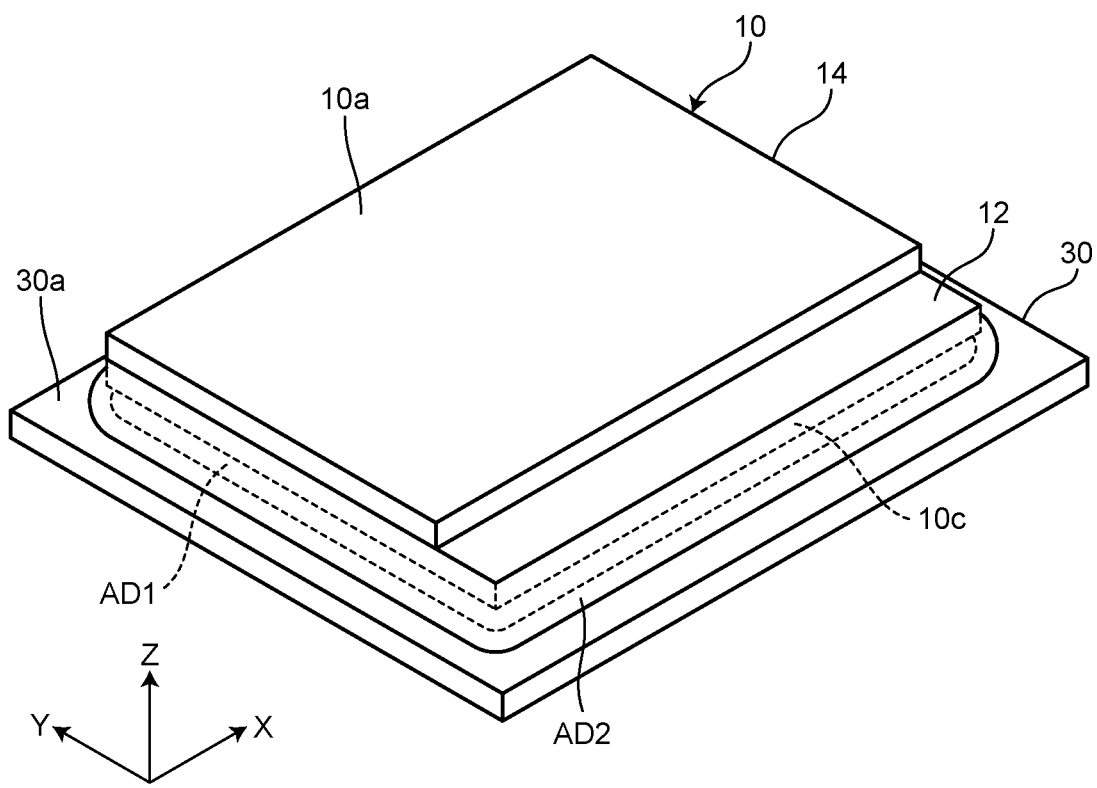
FIG. 10 is a perspective view illustrating the display panel and the color separation element to which a second adhesive has been applied at a second application step.

FIG. 10 is a perspective view illustrating the display panel 10 and the color separation element 30 to which a second adhesive AD2 has been applied at the second application step. At the second application step, the second adhesive AD2 is applied to the color separation element 30 and the display panel 10, which have been stuck to each other with the first adhesive AD1 therebetween, over the entire perimeter of the display panel 10 from the side surface 10c of the display panel 10 to the color separation element 30, outside of the first adhesive AD1 in plan view.

The second adhesive AD2 extends over the entire perimeter of the display panel 10 from the side surface 10c of the display panel 10 to the emitting surface 30a of the color separation element 30. The second adhesive AD2 is applied using a dispenser.

Next, the first adhesive AD1 and the second adhesive AD2 are cured at the curing step. As described above, the first adhesive AD1 and the second adhesive AD2 are UV curable adhesives, and the first adhesive AD1 and the second adhesive AD2 are irradiated with UV light of a given integrated light quantity at the curing step. The given integrated light quantity is derived from an experiment or the like conducted in advance and is the integrated light quantity in which the first adhesive AD1 and the second adhesive AD2 cure sufficiently. As the first adhesive AD1 and the second adhesive AD2 cure, the inner adhesive portion 40 and the outer adhesive portion 50 are formed.

If the first adhesive AD1 has voids as described above, the voids may become a starting point for the first adhesive AD1 to split when the first adhesive AD1 is discharged from the dispenser at the first application step. Splitting of the first adhesive AD1 decreases the contact area between the display panel 10 and the first adhesive AD1 and the contact area between the color separation element 30 and the first adhesive AD1 and decreases the adhesive force.

On the contrary, the second adhesive AD2 does not have voids as described above and does not split when discharged from the dispenser. Thus, the second adhesive AD2 is securely and continuously placed around the entire perimeter of the first adhesive AD1. The second adhesive AD2 is applied to the side surface 10c of the display panel 10 and the board surface of the color separation element 30, to secure a sufficient contact area with the display panel 10 and the color separation element 30. Thus, the outer adhesive portion 50 can make up for the decreased adhesive force of the inner adhesive portion 40 in the event that the first adhesive AD1 splits. Therefore, the adhesive force of the inner adhesive portion 40 and the outer adhesive portion 50 can be sufficiently secured.

Modification of Method for Manufacturing Display Device 1

For example, the inner adhesive portion 40 may be placed around the entire perimeter of the display region DA in plan view, without the discontinuous portion 40a. The first adhesive AD1 and the second adhesive AD2 may be adhesives other than a UV curable adhesive, such as a thermosetting adhesive, for example. Furthermore, the first adhesive AD1 and the second adhesive AD2 may be two-part adhesives.

It is understood that any other effects brought about by the modes described in the embodiments that are obvious from the description of the present specification or that would be conceived of by a person skilled in the art are naturally brought about by the present disclosure.

What is claimed is:

1. A display device comprising:
   a display panel including a plurality of pixels each having a color filter,
   a color separation element configured to disperse light from a light source and to emit, to the display panel, a plurality of rays of separated light with wavelengths different from each other;
   a light source emitting light and disposed under the color separation element; and
   an outer adhesive portion that bonds a side surface of the display panel and the color separation element to each other over an entire perimeter of the display panel, wherein
   the color separation element is larger than the display panel in plan view, and is disposed between the display panel and the light source, and
   the color separation element is configured to:
   separate the light emitted from the light source for each wavelength corresponding to a color of each color filter; and
   cause the separated light with the each wavelength corresponding to the color filter to enter and be transmitted through the color filter.

2. The display device according to claim 1, further comprising an inner adhesive portion containing a gap member of a given size, the inner adhesive portion bonding the display panel and the color separation element to each other inside of the outer adhesive portion in plan view.

3. The display device according to claim 2, wherein
   the display panel has a display region where an image is displayed, and
   the inner adhesive portion is around the display region in plan view.

4. The display device according to claim 2, wherein the inner adhesive portion has a discontinuous portion where a basic material is discontinuous.

5. The display device according to claim 1, wherein the outer adhesive portion is formed by a one-part adhesive.

6. A method for manufacturing a display device, the method comprising:
   applying a first adhesive containing a gap member of a given size to a board surface of a display panel;
   sticking together a board surface of a color separation element and the board surface of the display panel to which the first adhesive has been applied, with the first adhesive between the board surfaces, the board surface of the color separation element dispersing light from a light source and emitting a plurality of rays of separated light with wavelengths different from each other; and
   applying a second adhesive to the color separation element and the display panel, which have been stuck to each other with the first adhesive, over an entire perimeter of the display panel from a side surface of the display panel to the color separation element, outside of the first adhesive in plan view, wherein
   the display panel includes a plurality of pixels each having a color filter,
   the color separation element is larger than the display panel in plan view, and is disposed between the display panel and the light source, and
   the color separation element is configured to:
   separate the light emitted from the light source for each wavelength corresponding to a color of each color filter; and
   cause the separated light with the each wavelength corresponding to the color filter to enter and be transmitted through the color filter.

7. The method for manufacturing a display device according to claim 6, wherein at the sticking together the color separation element and the display panel, the gap member is sandwiched by the board surface of the color separation element and the board surface of the display panel.

8. The display device according to claim 1, wherein
   the pixels include a first pixel, a second pixel, and a third pixel,
   the color separation element has a separation region that emits the separated light,
   in the separation region, a front surface of the color separation element has an uneven shape, the front surface including a first range, a second range, and the third range, and
   the uneven shape of the color separation element is such that:
   first separated light gathers in the first pixel from the first range that is larger than the first pixel in plan view and that overlaps the first pixel in plan view;
   the second separated light gathers in the second pixel from the second range that is larger than the second pixel in plan view and that overlaps the second pixel in plan view; and the third separated light gathers in the third pixel from the third range that is larger than the third pixel in plan view and that overlaps the third pixel in plan view.

* * * * *